April 19, 1938. W. L. CARLSON Re. 20,700

TELEVISION SYSTEM

Original Filed Dec. 26, 1931 3 Sheets-Sheet 1

INVENTOR.
WENDELL L. CARLSON

BY H. S. Grover

ATTORNEY.

April 19, 1938. W. L. CARLSON Re. 20,700

TELEVISION SYSTEM

Original Filed Dec. 26, 1931 3 Sheets-Sheet 2

INVENTOR.
WENDELL L. CARLSON

BY H. S. Grover
ATTORNEY.

April 19, 1938. W. L. CARLSON Re. 20,700

TELEVISION SYSTEM

Original Filed Dec. 26, 1931 3 Sheets-Sheet 3

INVENTOR.
WENDELL L. CARLSON
BY
N. G. Grover
ATTORNEY.

Reissued Apr. 19, 1938

Re. 20,700

UNITED STATES PATENT OFFICE 20,700

TELEVISION SYSTEM

Wendell L. Carlson, Haddonfield, N. J., assignor to Radio Corporation of America, a corporation of Delaware Original No. 1,975,056, dated September 25, 1934, Serial No. 583,193, December 26, 1931. Application for reissue September 10, 1936, Serial No. 100,164

14 Claims. (Cl. 178—5.8)

My invention relates to improvements in television systems and, more particularly, to systems wherein two or more carrier frequencies are utilized, for example, one for the picture and synchronizing modulations and another for the sound modulation.

One of the objects of my invention is to provide an improved television system of the character referred to which simultaneously receives picture and sound modulations on adjacent carrier frequencies, and wherein the tuning for both picture and sound is accomplished by manipulation of a single knob or other single control element.

Another object of my invention is to provide an improved television system of the character referred to which effectively receives simultaneously and separates two or more modulated carrier waves on adjacent fequency channels without permitting any detrimental interference of either wave with the other.

Another object of my invention is to provide an improved system of the character referred to which allows for more advantageous utilization of the available frequency band than has been possible in such systems proposed heretofore.

Other objects and advantages will hereinafter appear.

In accordance with my invention, a radio-frequency amplifier is tuned broadly to two carrier frequencies located on adjacent portions of the frequency band, one carrier being modulated by picture signals, the other carrier being modulated by sound signals. The picture and sound frequencies are separated, after heterodyning to produce intermediate frequencies, through two parallel, tuned, intermediate-frequency amplifiers which have the same band widths and the same frequency separation as the modulated sight and sound frequencies.

Further, in accordance with my invention, a system of the character referred to is provided which embodies common radio-frequency and heterodyne oscillator circuits for the sound, picture and synchronizing signals, and separate intermediate-frequency and audio-frequency circuits for said signals, respectively.

My invention resides in a system and method of operation of the character hereinafter described and claimed.

For the purpose of illustrating my invention, several embodiments thereof are shown in the drawings, wherein:

Figs. 5, 6 and 7 are graphical showings, illustrative of the principle of operation.

In one embodiment of my invention a radio-frequency amplifier is tuned broadly to two carrier frequencies, one modulated by picture signals, horizontal synchronizing and vertical synchronizing signals, the other modulated by sound signals. Heterodyne detectors, having a common oscillator, operate to convert the amplified radio frequencies to different intermediate frequencies which pass through separate channels provided by two parallel, tuned, intermediate-frequency amplifiers. The intermediate amplifiers have the same band widths and the same frequency separation as the modulated picture and sound frequencies, and are tuned, respectively, to these frequencies.

Figure 1:
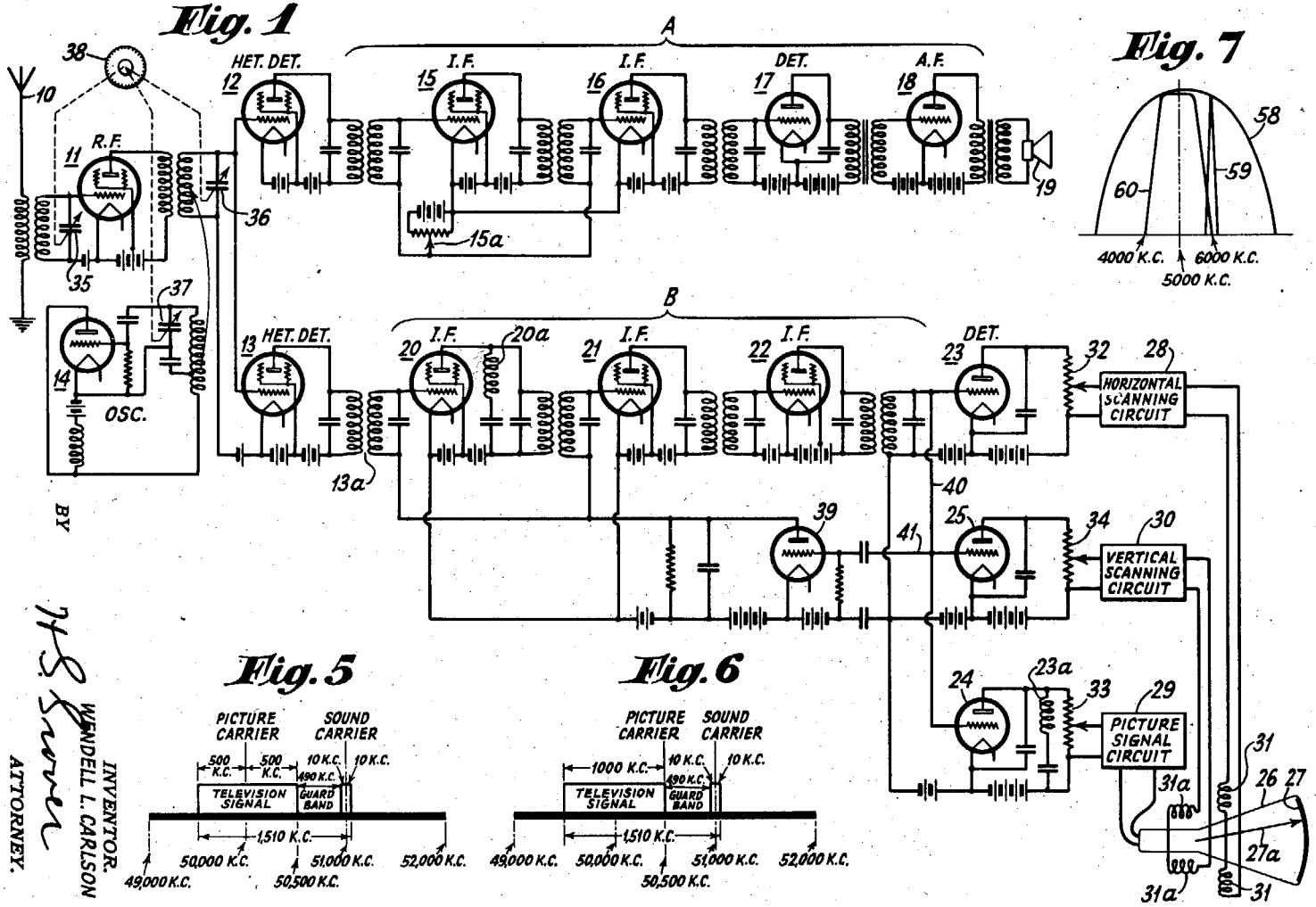
Figure 1 is a diagrammatic view of a television receiving system constructed and operated in accordance with my invention.

More specifically, and with reference to Fig. 1, the transmitted carriers, modulated as stated above, are intercepted by an antenna system 10 and are amplified by a radio-frequency amplifier 11 tuned broadly to both carriers.

For the purpose of separating the various frequencies so that the same can serve their respective, individual functions, heterodyne detectors 12 and 13, having a common oscillator 14, are employed to convert the amplified radio frequencies to different intermediate frequencies which traverse the channels A and B, respectively.

The channel A comprises a plurality of amplifier stages 15 and 16 tuned to the intermediate frequency of the carrier modulated by the sound signals and having sufficient selectivity to prevent the picture carrier or modulation from interfering with the sound reproduction. These signals are detected by a suitable detector 17, and are supplied through an audio amplifier 18 to a loudspeaker 19.

The channel B comprises a plurality of intermediate-frequency amplifier stages 20, 21 and 22 tuned to pass frequencies which cover the band required for the modulation produced by the picture and synchronizing frequencies, and have sufficient selectivity to prevent the sound carrier or modulation from interfering with the picture reproduction.

The channel B branches out, from individual detectors 23, 24 and 25, into separate channels for the horizontal synchronizing modulation signals, the picture modulation signals, and the vertical synchronizing modulation signals, respectively.

For the purpose of reproducing a picture in accordance with the received picture signals, the latter are supplied, through a suitable circuit 29, to the control grid of a cathode ray tube 26 of usual construction.

The tube 26 is provided at the large end thereof with a fluorescent screen 27. The ray of electrons 27*a* is caused to scan the screen 27 by passing a saw-tooth current wave, from a suitable circuit 28, through electromagnetic coils 31, and by passing a saw-tooth current wave, from a suitable circuit 30, through electromagnetic coils 31*a*.

The circuits 28, 29 and 30 may be of the same character as those disclosed in detail in the copending application by Arthur W. Vance, filed June 17, 1931, bearing Serial No. 544,959, and assigned to the RCA Victor Company, Inc.

In receiving systems embodying other types of picture-reproducing devices than a cathode ray tube, such, for example, as a neon tube and an associated Nipkow disk driven by an electric motor, the impulses from the circuit 28 may be utilized to maintain the speed of the motor in synchronism with the corresponding motion or action at the transmitting station, and the impulses from the circuit 30 may be utilized to hold the reproduced picture in frame. The terms "horizontal synchronizing" and "vertical synchronizing", as used for convenience in the specification and claims, are, therefore, intended to have a broad significance, and to refer to systems wherein the synchronizing impulses are used to control operating action of other types of picture-reproducing devices such as those of the mechanical variety.

The detector 24 passes all signals to the circuit 29, but the detectors 23 and 25 are preferably so biased beyond cut-off that only the peak modulations, consisting mainly of synchronizing impulses, will be efficiently passed on to the circuits 28 and 30. This action, whereby the picture and the two kinds of synchronizing impulses are distinguished at the various input circuits for the tube 26, is explained more fully in the copending application referred to.

Individual means, in the form of adjustable resistors 32, 33 and 34, are provided for independently varying the respective levels of the horizontal synchronizing signals supplied to the circuit 28, the picture signals supplied to the circuit 29, and the vertical synchronizing signals supplied to the circuit 30.

For the purpose of making the receiving system responsive selectively to a plurality of combinations of modulated carrier frequencies from as many different transmitting stations, each of the latter operating to transmit sound as well as picture signals, the variable condensers 35, 36 and 37 of the tuned circuits shown are actuated by a single knob or other suitable, single control element 38, as indicated. The receiving system, therefore, is tunable simultaneously for sound and picture signals from any one of a plurality of transmitting stations, by manual manipulation of the single knob 38.

In the various receiving systems of this general character proposed heretofore, difficulty has been encountered in adjusting the level of one kind of signals without effecting an undesirable variation in the level of one or more of the other kinds of signals. Subsequent readjustment of the latter level has, therefore, been necessary to bring it back to the desired point, but this second adjustment has operated to affect the previous adjustment referred to. It has, therefore, been necessary in the prior art systems to skillfully adjust and readjust the individual control parts, corresponding to the adjustable resistors 32, 33 and 34 in Fig. 1, to obtain the best action at the receiver for different conditions of signal levels. Furthermore, adjustment of the radio-frequency circuits, in the prior art systems, to different carrier frequencies from as many different transmitting stations, has entailed a rather laborious readjustment of the control corresponding to the adjustable resistors 32, 33 and 34 in Fig. 1.

I propose to avoid the difficulties referred to by employing means for automatically maintaining substantially constant the level of the picture signals applied to the detector 24, the level of the horizontal synchronizing signals applied to the detector 23, and the level of the vertical synchronizing signals applied to the detector 25, all independently of adjustment of the radio-frequency circuits in tuning the system to different transmitting stations. In the present embodiment of my invention, such automatic means embodies a detector tube 39 having its grid circuit supplied with signals from the output end of the intermediate-frequency amplifier in the channel B, through the connections 40 and 41. The plate circuit of the tube 39 is connected, as shown, to the grid circuits of the amplifier stages 20 and 21. In operation, when the knob 38 is adjusted to tune in a different transmitting station, which, for example, increases the levels of the various signals, the tube 39 will draw more plate current and effect a corresponding increase in the negative direction, of the grid bias on the stages 20 and 21. This compensating action operates, therefore, to maintain the levels of the various signals substantially constant to the grid circuits of the detectors 23, 24 and 25. If a transmitting station is tuned in to cause a decrease in the levels of the various signals, the tube 39 operates in the opposite sense, as will be well understood, to decrease the negative bias on the grid circuits of the stages 20 and 21, with the result, as before, that the levels in the grid circuits of the detectors 23, 24 and 25 remain substantially constant.

Figure 8:
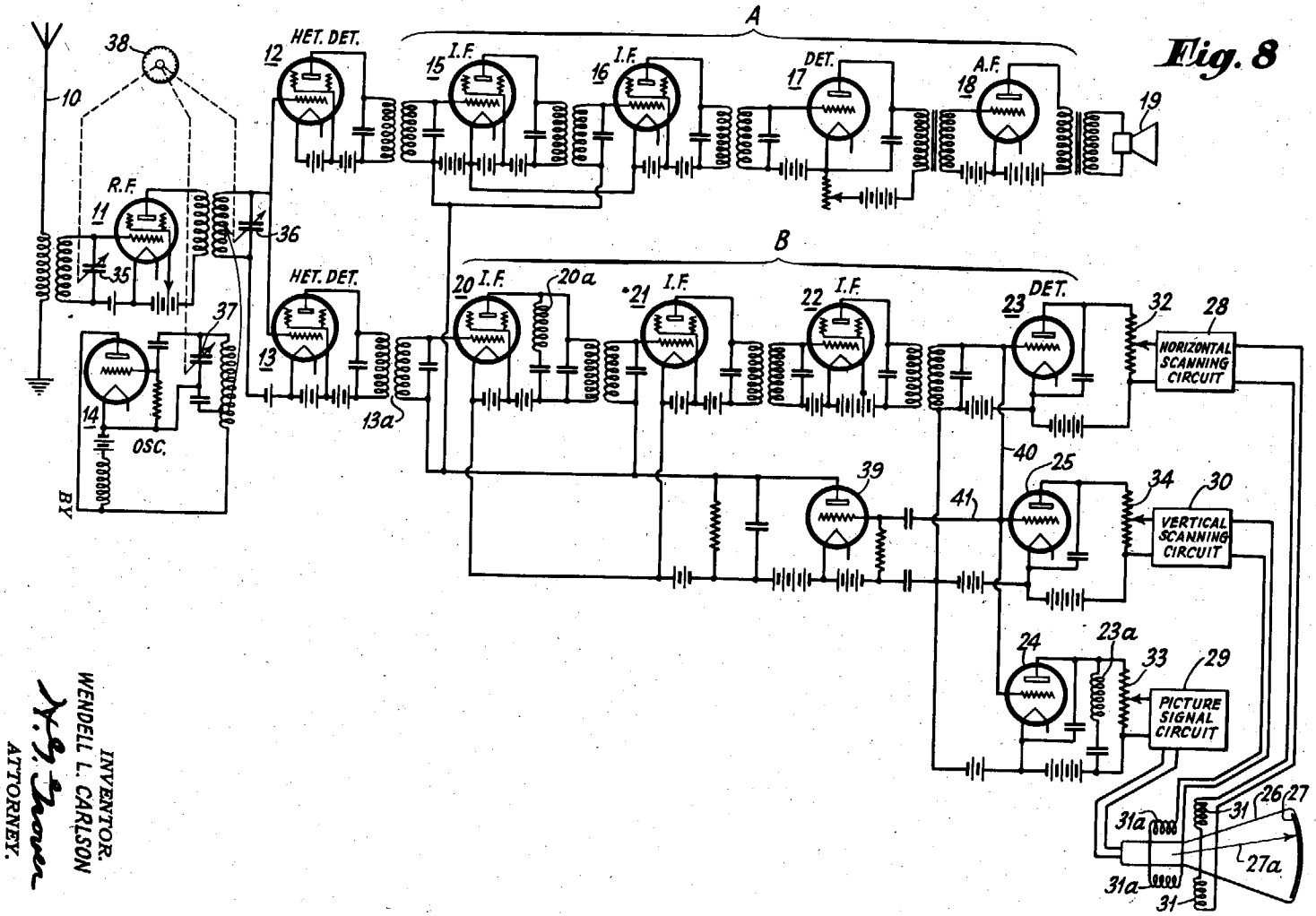
Fig. 8 illustrates a dual channel automatic volume control arrangement.

It is contemplated, in some cases, to provide an automatic volume control for the sound signals in the channel A. For such purpose, the same tube 39 may be used in the same way as is shown in connection with the picture channel B, that is, the plate circuit of the tube 39 would be connected to the grid circuits of the tubes 15 and 16 in the same way as the connection is made to the tubes 20 and 21. When the automatic volume control is incorporated, as explained, in the sound channel A, it is proposed to remove the manual control 15*a* from the input circuit of the tube 15 and replace the same with a manual control, for the same purpose, in the output circuit of the detector tube 17. This manual control would be similar to the manual controls 32, 33 and 34 at the output end of the picture channel B. Such an arrangement is illustrated in Fig. 8.

The amplifier tube 11 in Fig. 1 may be omitted in some cases, and the circuit 36 then coupled directly to the circuit 35 in any suitable way. As another alternative, separate and individual radio-frequency circuits for the sound and television carriers may be employed in lieu of the common circuits shown comprising the tube 11 and the circuits 35 and 36.

For the purpose of providing further assurance against interference with the television signals by the sound carrier wave, tuned trap circuits 20a and 23a may be connected as shown in the plate circuits of the tubes 20 and 24, respectively. The trap 20a is tuned to the intermediate frequency of the channel A, while the trap 23a, is tuned to the frequency difference between the sound and picture carriers.

The series-tuned traps 20a and 23a may take the form of parallel resonant circuits. Any desired number of these circuits may be employed and connected to the amplifiers in any conventional manner. Traps similar to 20a may also be tuned so as to reject other frequencies such as a sound-modulated carrier from an adjacent channel station.

Figure 2:
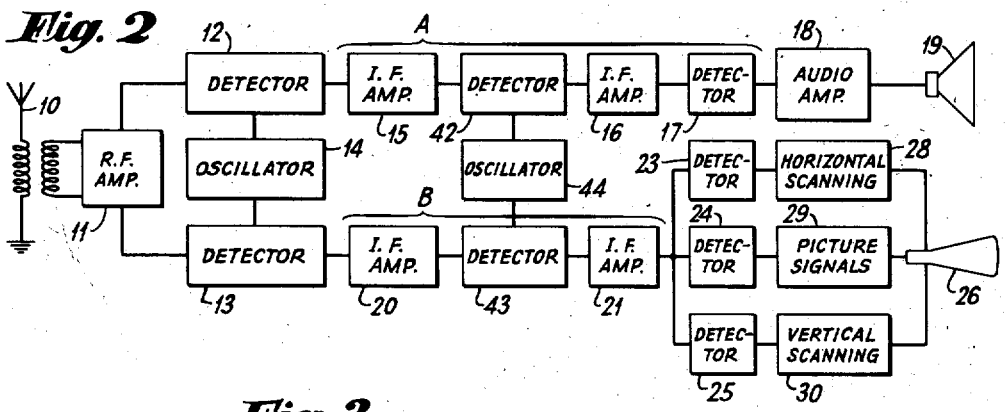
Figs. 2, 3 and 4 are block diagrams, showing several modifications.

The system in Fig. 1 may be modified as shown in Fig. 2, wherein the double heterodyne principle is used. In this modification, the additional heterodyne detectors 42 and 43, having a common oscillator 44, are interposed in the channels A and B between stages of the intermediate-frequency amplifiers to convert the signals to new frequencies a second time. The connections and operating action, otherwise, are the same as in Fig. 1, and the various parts and circuits have been designated by the same reference numerals which designate corresponding parts and circuits in Fig. 1.

Figure 3:
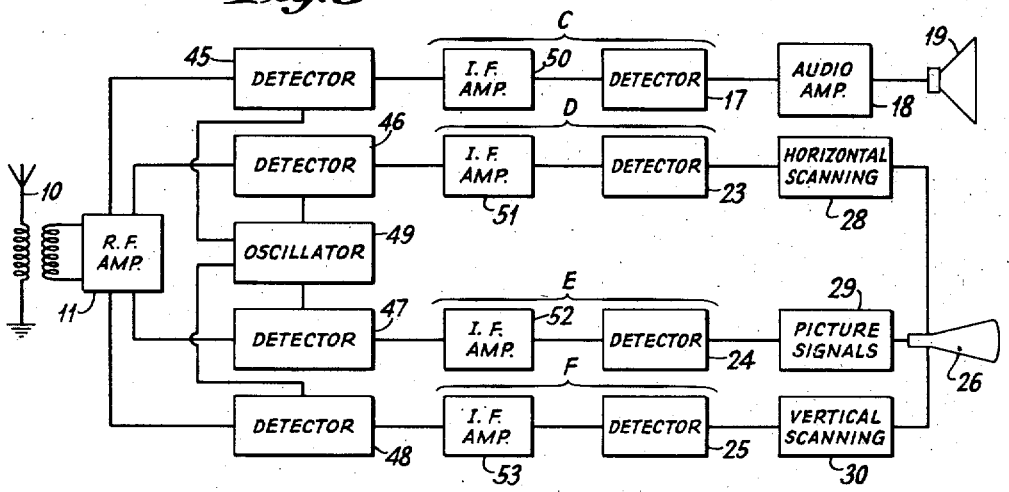

In Figs. 1 and 2 it has been assumed that the signals have been transmitted in the form of two carrier frequencies, one modulated by the sound signals and the other modulated by the picture and synchronizing signals. However, if conditions are such that a separate carrier frequency is used for transmitting each kind of signal, the system in Fig. 1 takes the arrangement shown in Fig. 3, wherein the radio-frequency amplifier 11, as in Figs. 1 and 2, is tunable broadly to the carrier frequencies from any one of a number of transmitting stations. These frequencies are converted to intermediate frequencies by heterodyne detectors 45, 46, 47 and 48 having a common oscillator 49. These detectors provide separate channels C, D, E and F for the respective signals. In these channels, the intermediate-frequency amplifiers 50, 51, 52 and 53 are tuned, respectively, to the frequencies of the sound signals, the horizontal synchronizing signals, the picture signals, and the vertical synchronizing signals. In Fig. 3, therefore, the various kinds of signals are separated into individual channels for each, from the output side of the radio-frequency amplifier 11. In Fig. 3, as in Fig. 2, the various parts and circuits have been designated by the same reference numerals which designate corresponding parts and circuits in Fig. 1.

In Figs. 1, 2 and 3 separation of the sound and television channels starts from the first detectors, and in Figs. 1 and 2 the picture and the horizontal and vertical synchronizing signals are separated from the second detectors 23, 24 and 25 into their respective channels. In the modification shown in Fig. 4, separation of the sound and television channels starts from a first intermediate-frequency stage 54, while separation of the picture and the horizontal and vertical synchronizing signals into their respective channels starts from an audio amplifier 55 supplied from and disposed beyond the second detector 56. A single heterodyne detector 57 is interposed, as shown, between the radio-frequency amplifier 11 and the intermediate-frequency stage 54. In this figure, the various parts and circuits have been designated by the same reference numerals which designate corresponding parts and circuits in Fig. 1.

Figure 4:
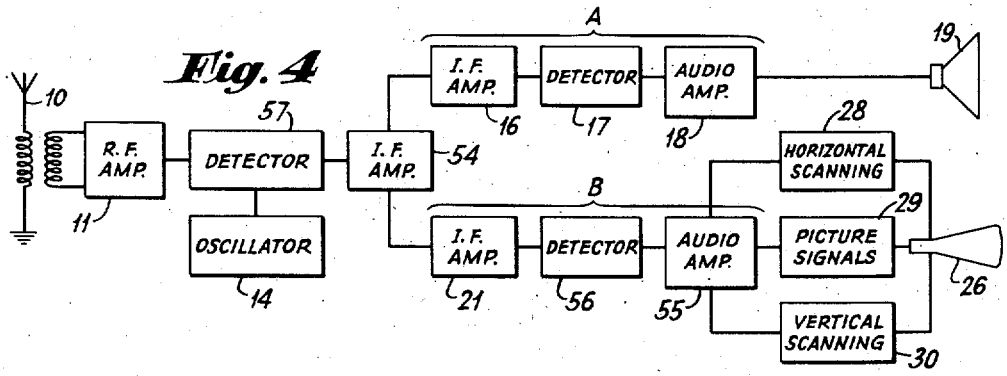

In Figs. 2, 3 and 4, as in Fig. 1, a single knob may be employed for simultaneously tuning the system for sound and picture signals.

In carrying out the operation of my improved system, the frequency of the picture carrier may be 50,000 kilocycles and that of the sound carrier may be 51,000 kilocycles. This condition is represented graphically in Fig. 5. In this case, the picture transmitter may be modulated up to 500 kilocycles and the sound transmitter may be modulated up to 10 kilocycles, as indicated. This provides a guard band of 490 kilocycles between the sound and picture modulation frequencies, the total frequency band required for one station being 1510 kilocycles. This band of frequencies is impressed on the radio frequency input circuit of the receiver, which may have a characteristic similar to the curve 58 in Fig. 7. The local heterodyne oscillator may be operating at 45,000 kilocycles which will beat with the received signals to give a picture intermediate frequency of 5000 kilocycles plus and minus 500 kilocycles and a sound intermediate frequency of 6000 kilocycles plus and minus 10 kilocycles. These signals are, in turn, impressed on the intermediate-frequency channels or circuits A and B in Fig. 1, for example, which may have characteristics as shown by the curves 59 and 60, respectively. It is important that the attenuation of the picture intermediate-frequency amplifier at 6000 kilocycles be sufficient to prevent the sound carrier from interfering with the picture reproduction. The desired attenuation is obtained by employing a number of resonant transformers such as 13a and rejector circuits such as the traps 20a and 23a in Fig. 1.

The same receiver may be employed for receiving a single side band with carrier-picture transmission. In this case, the frequency of the transmitter picture carrier would be 50,500 kilocycles and that of the sound carrier would be 51,000 kilocycles. This condition is represented in Fig. 6. In this case, the picture frequency modulation may be increased to 1000 kilocycles, as indicated and still provide for operation of the system within a 1510 kilocycle channel and with a guard band of 490 kilocycles between the sound and picture modulation frequencies, as in Fig. 5.

From the foregoing, it will be seen that I have provided an improved television receiving system which can be easily adjusted for different operating conditions, which can simultaneously receive two or more signals in duplex without cross interference, which can be tuned to different transmitting stations by turning a single knob, and which automatically adjusts itself to compensate for varying conditions of levels of the intercepted signals.

Furthermore, it will be understood from the foregoing description that by reason of the cooperative action between the various mechanical and electrical parts of my improved television receiving system, considered as a whole, I have provided a system which embodies an automatic volume control device in connection with the picture-signal amplifier channel and which can also be tuned easily by manual manipulation of only the single knob 38 to tune from one station to another, and in a way which gives the operator a clear indication as to when the receiver is adjusted to the point for most efficient reception of the picture signals. In this connection, it will be understood that the automatic volume control for the picture-signal amplifier channel B serves a very important purpose for the reason that the synchronizing signals also pass through this channel with the picture signals. That is, if the level of the signals at the output of the channel B decreases appreciably due to the phenomenon commonly referred to as "fading", or due to tuning from a local station to a distant station, for example, the synchronizing signals will be considerably less effective with respect to the deflecting circuits 28 and 30. For this reason the scanning action of the cathode ray tube 26 might fall out of synchronism with such action at the transmitter. Also, the overall brilliancy of the reproduced picture might decrease substantially, and even to a point whereat the picture would not be recognizable. On the other hand, if the level of the picture and synchronizing signals should increase substantially due to tuning from a distant station to a local station, for example, the amplifier might be overloaded and, also, the overall brilliancy of the picture on the screen 27 might increase to an undesirable extent. While the automatic volume control associated with the channel B avoids these difficulties, it would ordinarily require skillful manipulation of the various adjusting knobs such as are necessary in the systems proposed heretofore to tune the receiver for most efficient reception of the picture and synchronizing signals.

In my improved system, however, the single tuning knob 38 is mechanically connected to both the radio-frequency amplifier 11 and the heterodyne detector 14, and the connections are such that when the sound-signal carrier frequency from a particular transmitting station is heterodyned to substantially the middle of the band width of intermediate frequencies to which the sound-signal amplifier channel A is tuned relatively sharply, the picture-signal carrier frequency is then heterodyned to a predetermined frequency within the band width of intermediate frequencies to which the channel B is tuned relatively broadly. That is, the knob 38 is turned until the sound signals from a particular transmitting station are received well, in which case the entire picture-signal channel will also be tuned for most efficient reception of the picture and synchronizing signals. Furthermore, by providing the three detector tubes 23, 25 and 24 at the output end of the channel B, any one of the resistors 32, 34 and 33 associated, respectively, with these tubes can be adjusted without affecting adjustment of the other tubes.

The entire action, therefore, insures very efficient and positive operation, with the synchronizing signals on the same carrier with the picture signals, this being important for the reason that the synchronizing signals are then applied with the picture signals to the control grid of the tube 26, and, being negative or in the "black" direction, are effective to cut off the ray during return deflection thereof in both the horizontal and vertical directions.

While only a few preferred embodiments of my invention have been disclosed, it will be understood that other embodiments are feasible without departing from the spirit of my invention or the scope of the claims.

I claim as my invention:

1. In a television receiver, a radio-frequency amplifier tunable to a plurality of pairs of carrier frequencies, one carrier of each pair being modulated by picture signals and synchronizing signals at relatively high and relatively low frequencies and the other carrier being modulated by sound signals, heterodyne detector means including an oscillator and supplied from said amplifier for converting the amplified carrier frequencies to different intermediate carrier frequencies, a picture-signal amplifier channel supplied from said detector means and tuned relatively broadly to a given band width of intermediate frequencies over a range of at least substantially one thousand kilocycles, a sound-signal amplifier channel supplied from said detector means and tuned relatively sharply to a band width of intermediate frequencies over a range of at least substantially ten kilocycles and which is spaced from the first-mentioned band by an amount representing a frequency band width of at least substantially four hundred kilocycles, a single manually-operable element for tuning the radio-frequency amplifier to any one of said pairs of carrier frequencies and for simultaneously adjusting said heterodyne detector means to vary the intermediate carrier frequencies in such manner that for reception of any pair of modulated carrier frequencies said picture-signal amplifier channel will be tuned to a predetermined frequency within said first-mentioned band width of intermediate frequencies when the sound-signal intermediate-frequency carrier is tuned to substantially the middle of the second-mentioned band width of intermediate frequencies to which said sound-signal amplifier channel is tuned relatively sharply, means associated with said picture-signal amplifier channel for automatically maintaining the level of the output signals therefrom substantially constant, a sound-reproducing device supplied from said sound-signal amplifier channel, a cathode ray picture-reproducing device, first and second and third detector tubes supplied from said picture-signal amplifier channel, means supplied only from said first detector tube for deflecting the ray at the said relatively high frequency, and means supplied only from said second detector tube for deflecting the ray at the said relatively low frequency, said cathode ray device being supplied with picture signals from only said third detector tube.

2. In a television receiver, a radio-frequency amplifier tunable to a plurality of pairs of carrier frequencies, one carrier of each pair being modulated by picture signals and synchronizing signals at relatively high and relatively low frequencies and the other carrier being modulated by sound signals, heterodyne detector means including an oscillator and supplied from said amplifier for converting the amplified carrier frequencies to different intermediate carrier frequencies, a picture-signal amplifier channel supplied from said detector means and tuned relatively broadly to a given band width of intermediate frequencies over a range of at least substantially one thousand kilocycles, a sound-signal amplifier channel supplied from said detector means and tuned relatively sharply to a band width of intermediate frequencies over a range of at least substantially ten kilocycles and which is spaced from the first-mentioned band by an amount representing a frequency band width of at least substantially four hundred kilocycles, a single manually-operable element for tuning the radio-frequency amplifier to any one of said pairs of carrier frequencies and for simultaneously adjusting said heterodyne detector means to vary the intermediate carrier frequencies in such manner that for reception of any pair of modulated carrier frequencies said picture-signal amplifier channel will be tuned to a predetermined frequency within said first-mentioned band width of intermediate frequencies when the sound-signal intermediate-frequency carrier is tuned to substantially the middle of the second-mentioned band width of intermediate frequencies to which said sound-signal amplifier channel is tuned relatively sharply, means associated with said picture-signal amplifier channel for automatically maintaining the level of the output signals therefrom substantially constant, a sound-reproducing device supplied from said sound-signal amplifier channel, a picture-reproducing device supplied with picture signals from said picture-signal amplifier, and means supplied with synchronizing signals from said picture-signal amplifier for effecting scanning action of said picture-reproducing device at a rate corresponding to the frequency of occurrence of the synchronizing signals.

3. In a television receiver, a radio frequency selector tunable to a plurality of pairs of carrier frequencies, one carrier of each pair being modulated by picture signals and synchronizing signals at relatively high and relatively low frequencies, and the other carrier being modulated by sound signals, heterodyne detector means including an oscillator, said detector means being supplied with signals from said selector for converting the selected carrier frequencies to different intermediate carrier frequencies, a picture signal amplifier channel supplied from said detector means and tuned relatively broadly to a given band width of intermediate frequencies over a range of at least one thousand kilocycles, a sound signal amplifier channel supplied from said detector means and tuned relatively sharply to a band width of intermediate frequencies over a range of at least five kilocycles and which is spaced from the first-mentioned band by an amount representing a frequency band width of at least two hundred kilocycles, a single manually operable element for tuning the radio frequency selector to any one of said pairs of carrier frequencies and for simultaneously adjusting the heterodyne detector means to vary the intermediate carrier frequencies in such manner that for reception of any pair of modulated carrier frequencies said picture signal will be tuned to a predetermined frequency within the operating frequency range of said first-mentioned band of intermediate frequencies when the sound signal intermediate frequency carrier is tuned to a predetermined frequency within the operating frequency range of the second-mentioned band of intermediate frequencies, a sound reproducing device supplied from said sound signal amplifier channel, a picture reproducing device supplied with picture signals from said picture signal amplifier, and means supplied with synchronizing signals from said picture signal amplifier for effecting scanning action of said picture reproducing device at a rate corresponding to the frequency of occurrence of the synchronizing signals.

4. In a television receiver, a radio frequency selector tunable to a plurality of pairs of carrier frequencies, one carrier of each pair being modulated by picture signals and synchronizing signals at relatively high and relatively low frequencies, and the other carrier being modulated by sound signals, heterodyne detector means including an oscillator, said detector means being supplied with signals from said selector for converting the selected carrier frequencies to different intermediate carrier frequencies, a picture signal amplifier channel supplied from said detector means and tuned relatively broadly to a given band width of intermediate frequencies over a range of at least one thousand kilocycles, a sound signal amplifier channel supplied from said detector means and tuned to a band width of intermediate frequencies over a range of at least 2% of the band width of the picture signal amplifier and which is spaced from the first-mentioned band by an amount representing a frequency band width of at least four hundred kilocycles, a single manually operable element for tuning the radio frequency selector to any one of said pairs of carrier frequencies and for simultaneously adjusting the heterodyne detector means to vary the intermediate carrier frequencies in such manner that for reception of any pair of modulated carrier frequencies said picture signal will be tuned to a predetermined frequency within said first-mentioned band width of intermediate frequencies when the sound signal intermediate frequency carrier is tuned to a predetermined frequency within the second-mentioned band of intermediate frequencies, a sound reproducing device supplied from said sound signal amplifier channel, a picture reproducing device supplied with picture signals from said picture signal amplifier, and means supplied with synchronizing signals from said picture signal amplifier for effecting scanning action of said picture reproducing device at a rate corresponding to the frequency of occurrence of the synchronizing signals.

5. In a television receiver, a radio frequency selector tunable to a plurality of pairs of carrier frequencies, one carrier of each pair being modulated by picture signals and synchronizing signals at relatively high and relatively low frequencies, and the other carrier being modulated by sound signals, heterodyne detector means including an oscillator, said detector means being supplied with signals from said selector for converting the selected carrier frequencies to different intermediate carrier frequencies, a picture signal amplifier channel supplied from said detector means and tuned relatively broadly to a given band width of intermediate frequencies over a range of at least one thousand kilocycles, a sound signal amplifier channel supplied from said detector means and tuned to a band width of intermediate frequencies over a range of the order of at least ten kilocycles and which is spaced from the first-mentioned band by an amount representing a frequency band width of at least four hundred kilocycles, a single manually operable element for tuning the radio frequency selector to any one of said pairs of carrier frequencies and for simultaneously adjusting the heterodyne detector means to vary the intermediate carrier frequencies in such manner that for reception of any pair of modulated carrier frequencies said picture signal will be tuned to a predetermined frequency within said first-mentioned band width of intermediate frequencies when the sound signal intermediate frequency carrier is tuned to a predetermined frequency within the second-mentioned band of intermediate frequencies, a sound reproducing device supplied from said sound signal amplifier channel, a picture reproducing device supplied with the picture signals from said picture signal amplifier, and means supplied with synchronizing signals from said picture signal amplifier for effecting scanning action of said picture signal reproducing device at a rate corresponding to the frequency of occurrence of the synchronizing signals.

6. In a television receiver, a radio frequency selector tunable to a plurality of pairs of carrier frequencies, one carrier of each pair being modulated by picture signals and synchronizing signals at relatively high and relatively low frequencies, and the other carrier being modulated by sound signals, heterodyne detector means including an oscillator, said detector means being supplied with signals from said selector for converting the selected carrier frequencies to different intermediate carrier frequencies, a picture signal amplifier channel supplied from said detector means and tuned relatively broadly to a given band width of intermediate frequencies over a range of at least one thousand kilocycles, a sound signal amplifier channel supplied from said detector means and tuned to a band width of intermediate frequencies over a range of the order of at least 2% of the band width of the picture signal amplifier and which is spaced from the first-mentioned band by an amount representing a frequency band width in the order of four hundred kilocycles, a single manually operable element for tuning the radio frequency selector to any one of said pairs of carrier frequencies and for simultaneously adjusting the heterodyne detector means to vary the intermediate carrier frequencies in such manner that for reception of any pair of modulated carrier frequencies said picture signal will be tuned to a predetermined frequency within said first-mentioned band width of intermediate frequencies when the sound signal intermediate frequency carrier is tuned to a predetermined frequency within the second-mentioned band of intermediate frequencies, a sound reproducing device supplied from said sound signal amplifier channel, a picture reproducing device supplied with picture signals from said picture signal amplifier, and means supplied with synchronizing signals from said picture signal amplifier for effecting scanning action of said picture reproducing device at a rate corresponding to the frequency of occurrence of the synchronizing signals.

7. In a television receiver, a radio frequency selector tunable to a plurality of pairs of carrier frequencies, one carrier of each pair being modulated by picture signals and synchronizing signals at relatively high and relatively low frequencies, and the other carrier being modulated by sound signals, heterodyne detector means including an oscillator, said detector means being supplied with signals from said selector for converting the selected carrier frequencies to different intermediate carrier frequencies, a picture signal amplifier channel supplied from said detector means and tuned relatively broadly to a given band width of intermediate frequencies over a range of at least one thousand kilocycles, a sound signal amplifier channel supplied from said detector means and tuned to a band width of intermediate frequencies over a range of at least ten kilocycles and which is spaced from the first-mentioned band by an amount representing a frequency band width of the order of four hundred kilocycles, a single manually operable element for tuning the radio frequency selector to any one of said pairs of carrier frequencies and for simultaneously adjusting the heterodyne detector means to vary the intermediate carrier frequencies in such manner that for reception of any pair of modulated carrier frequencies said picture signal will be tuned to a predetermined frequency within said first-mentioned band width of intermediate frequencies when the sound signal intermediate frequency carrier is tuned to a predetermined frequency within the second-mentioned band of intermediate frequencies, means associated with said picture signal amplifier channel for automatically maintaining a level of the output signals therefrom substantially constant, a sound reproducing device supplied from said sound signal amplifier channel, a picture reproducing device supplied with picture signals from said picture signal amplifier, and means supplied with synchronizing signals from said picture signal amplifier for effecting scanning action of said picture reproducing device at a rate corresponding to the frequency of occurrence of the synchronizing signals.

8. In a television receiver, a radio frequency selector tunable to a plurality of pairs of carrier frequencies, one of said separate carriers being modulated by video signals and the other of said carriers being modulated by audio signals, means for detecting each of said carrier frequencies, means for developing a potential representative of the signal level of one of said carriers, and means for controlling the level of the signals of both the sound and video signals with said developed potential.

9. In a television receiver, a radio frequency selector tunable to a plurality of pairs of carrier frequencies, one of said separate carriers being modulated by video and synchronizing signals and the other of said carriers being modulated by audio signals, means for detecting each of said carrier frequencies, means for developing a potential representative of the signal level of one of said carriers, and means for controlling the level of the signals of both the sound and video signals with said developed potential.

10. In a television receiver, a radio frequency selector tunable to a plurality of pairs of carrier frequencies, one of said separate carriers being modulated by video signals and the other of said carriers being modulated by audio signals, a common means for detecting each of said frequencies in a pair of said carrier frequencies, means for developing from one of said signals a potential representative of the received signal intensity, and means for controlling the level of both sound and video signals with such developed potential.

11. In a television receiver, a radio frequency selector tunable to a plurality of pairs of carrier frequencies, one of said separate carriers being modulated by video and synchronizing signals and the other of said carriers being modulated by audio signals, a common means for detecting each of said frequencies in a pair of said carrier frequencies, means for developing from one of said signals a potential representative of the received signal intensity, and means for controlling the level of both sound and video signals with such developed potential.

12. In a television receiver, a radio frequency selector tunable to a plurality of pairs of carrier frequencies, one carrier of each pair being modulated by video signals and the other carrier of each pair being modulated by sound signals, means for detecting such carriers so as to develop signals representative of the video and audio signal values, means for carrying each frequency of said pairs of carrier frequencies along separate channels, means for developing from the video signals a direct potential, and means for controlling the gain of each of said channels in accordance with said direct potential.

13. In a television receiver, a radio frequency selector tunable to a plurality of pairs of carrier frequencies, one carrier of each pair being modulated by video and synchronizing signals and the other carrier of each pair being modulated by sound signals, means for detecting such carriers so as to develop signals representative of the video and audio signal values, means for carrying each frequency of said pairs of carrier frequencies along separate channels, means for developing from the video signals a direct potential, and means for controlling the gain of each of said channels in accordance with said direct potential.

14. In a television receiver, a radio frequency selector tunable to a plurality of pairs of carrier frequencies, one carrier of each pair being modulated by video and synchronizing signals and the other carrier of each pair being modulated by sound signals, means for detecting such carriers so as to develop signals representative of the video and audio signal values, means for carrying each frequency of said pairs of carrier frequencies along separate channels, means for developing from the video signals a direct potential, and means for controlling the gain of each of said channels in accordance with said direct potential.

WENDELL L. CARLSON.